(12) United States Patent
McGowan

(10) Patent No.: US 10,140,457 B2
(45) Date of Patent: Nov. 27, 2018

(54) SECURE INPUT/OUTPUT DEVICE MANAGEMENT

(71) Applicant: Intel Corporation, Santa Clara, CA (US)

(72) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 15/010,785

(22) Filed: Jan. 29, 2016

(65) Prior Publication Data

US 2017/0032132 A1 Feb. 2, 2017

Related U.S. Application Data

(60) Provisional application No. 62/199,687, filed on Jul. 31, 2015.

(51) Int. Cl.
*G06F 21/00* (2013.01)
*G06F 21/60* (2013.01)
(Continued)

(52) U.S. Cl.
CPC ............ *G06F 21/602* (2013.01); *G06F 13/28* (2013.01); *G06F 13/4068* (2013.01); *G06F 13/4282* (2013.01); *G06F 21/57* (2013.01)

(58) Field of Classification Search
CPC .................................................... G06F 21/602
(Continued)

(56) References Cited

U.S. PATENT DOCUMENTS 7,716,389 B1 *  5/2010  Bruce .................... G06F 13/28
                                                    370/338
7,761,618 B2 *  7/2010  Avraham ............... G06F 21/55
                                                    710/36

(Continued)

OTHER PUBLICATIONS

International Search Report and Written Opinion of the International Search Authority received in counterpart Application No. PCT/US2016/038378, dated Sep. 23, 2016, 12 pages.

*Primary Examiner* — Harris C Wang
(74) *Attorney, Agent, or Firm* — Nicholson De Vos Webster & Elliott LLP

(57) ABSTRACT

Embodiments of apparatus and methods for secure I/O device management are disclosed. In an embodiment, an apparatus includes a processor and an I/O controller. The processor has secure execution environment support, wherein the processor is to establish a secure execution environment using the secure execution environment support. The I/O controller includes an integrated trusted I/O device, wherein the trusted I/O device is to receive an unencrypted request to configure the trusted I/O device via a default control endpoint of the trusted I/O device, configure a command endpoint and a response endpoint in response to receipt of the unencrypted request, receive an encrypted command from the secure execution environment via the command endpoint, perform a device management operation related to the I/O controller in response to receipt of the encrypted command, and transmit an encrypted response to the secure execution environment via the response endpoint in response to performance of the device management operation.

20 Claims, 5 Drawing Sheets

(51) Int. Cl.
*G06F 13/28* (2006.01)
*G06F 13/42* (2006.01)
*G06F 13/40* (2006.01)
*G06F 21/57* (2013.01)

(58) Field of Classification Search
USPC .......................................................... 726/26
See application file for complete search history.

(56) References Cited

U.S. PATENT DOCUMENTS

| | | | |
|---|---|---|---|
| 8,165,301 B1 | 4/2012 | Bruce et al. | |
| 8,332,557 B2* | 12/2012 | Sthoeger | G06F 13/385 710/110 |
| 9,076,003 B2* | 7/2015 | Raskin | G06F 21/602 |
| 9,734,092 B2* | 8/2017 | Horovitz | G06F 21/79 |
| 2004/0210760 A1 | 10/2004 | McGrath et al. | |
| 2004/0211835 A1* | 10/2004 | Tournemille | G06K 7/0008 235/441 |
| 2005/0015611 A1* | 1/2005 | Poisner | G06F 21/82 726/2 |
| 2005/0144476 A1 | 6/2005 | England et al. | |
| 2006/0218409 A1* | 9/2006 | Avraham | G06F 13/102 713/189 |
| 2007/0294745 A1 | 12/2007 | Tan et al. | |
| 2011/0314468 A1* | 12/2011 | Zhou | G06F 9/45558 718/1 |
| 2012/0084438 A1* | 4/2012 | Raleigh | H04L 41/046 709/224 |
| 2013/0067245 A1* | 3/2013 | Horovitz | G06F 12/1408 713/193 |
| 2013/0227301 A1* | 8/2013 | Sarcone | G06F 21/85 713/189 |
| 2013/0346600 A1* | 12/2013 | Massey | G06F 9/542 709/224 |
| 2014/0149743 A1* | 5/2014 | Kidron | G06F 21/85 713/160 |
| 2014/0188732 A1* | 7/2014 | Kobres | H04L 63/0442 705/64 |
| 2015/0058637 A1* | 2/2015 | Raskin | G06F 21/602 713/189 |
| 2015/0269091 A1* | 9/2015 | Horovitz | G06F 21/79 711/145 |
| 2015/0363590 A1* | 12/2015 | Patel | G06F 21/44 713/182 |
| 2017/0024570 A1* | 1/2017 | Pappachan | G06F 13/28 |
| 2017/0032132 A1* | 2/2017 | McGowan | G06F 21/602 |

* cited by examiner

METHOD 500

180
SECURE INPUT/OUTPUT DEVICE MANAGEMENT

CLAIM OF PRIORITY

This application claims the priority filing benefit of U.S. Provisional Patent Application No. 62/199,687, entitled "USB Trusted I/O Device" and filed on Jul. 31, 2015.

BACKGROUND

Current processors may provide support for a secure and/or trusted execution environment such as a secure enclave, also known as an architectural enclave. Secure enclaves include segments of memory (including code and/or data) protected by the processor from unauthorized access including unauthorized reads and writes. In particular, certain processors may include Intel® Software Guard Extensions (SGX) to provide secure enclave support.

In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect input/output (I/O) data that moves across the on-chip boundary.

Current computing devices perform Universal Serial Bus (USB) device enumeration and topology management "in the clear," that is, the operations are not encrypted. Thus, for current computing devices, malicious system software may easily identify commands, modify commands, modify results to provide false information to a secure enclave, or block commands or results to deny service entirely.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
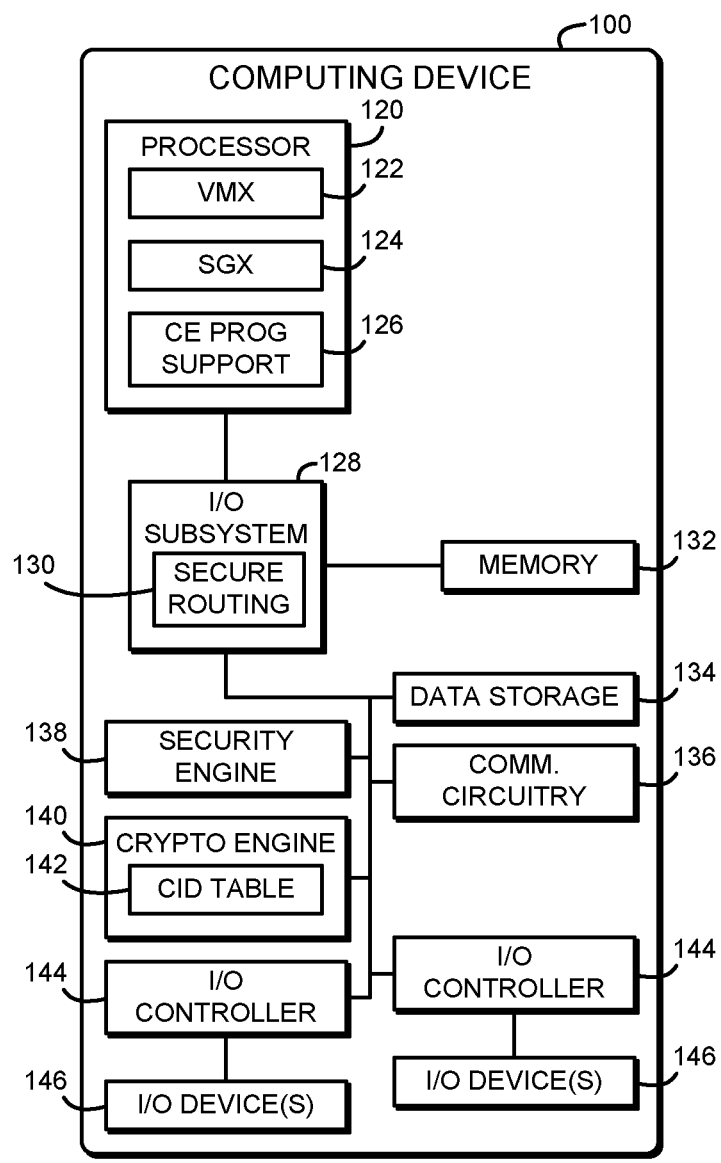
FIG. 1 is a simplified block diagram of at least one embodiment of a computing device for secure enumeration and topology management for I/O devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure enumeration and topology management for I/O devices includes, among other components, a processor 120, a converged hardware cryptographic (crypto) engine 140, and one or more I/O controllers 144 in communication with one or more I/O devices 146. In use, as further described below, the crypto engine 140 provides on-the-fly encryption and decryption of data transferred via direct memory access (DMA) operations from/to platform I/O controllers 144 to/from memory 132. Each DMA transaction is tagged with a channel ID (CID) representing a flow of data associated with a particular I/O device 146 or set of I/O devices 146. The crypto engine 140 uses the CID to reliably identify transactions that must be protected, retrieve the corresponding encryption keys, and perform appropriate cryptographic operations on the DMA data. The crypto engine 140 is programmed, for example with channel information and associated encryption keys, by trusted software using one or more specialized instructions of the processor 120.

To support secure enumeration and topology management of USB devices, this disclosure describes a USB Trusted I/O (TIO) device that is integrated into the USB host controller (e.g. the xHCI). The disclosed USB TIO device may support securely sending and receiving I/O from/to secure and/or trusted execution environments (e.g., secure enclaves established using Intel® SGX). As described further below, the USB TIO device provides the ability for a secure enclave to securely enumerate connected devices to the USB host controller and the ability for a secure enclave to manage device changes (e.g., connects/disconnects) while secure I/O is taking place. Thus, the disclosed technologies support secure I/O data integrity (that is, verification of the source of the I/O data) for secure enclaves using I/O technology that supports hot-plug and hot-unplug of I/O devices. Although this disclosure describes an illustrative embodiment involving USB, it should be understood that the underlying disclosure may apply to any I/O bus technology that supports hot-plug devices, e.g., Bluetooth, PCIe, etc.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a secure and/or trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the crypto engine 140 to provide cryptographic protection of I/O data. The crypto engine programming support 126 may be embodied as one or more specialized processor instructions (e.g., the instructions EBIND and/or UNWRAP) and associated hardware, microcode, firmware, or other components of the processor 120.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. The I/O subsystem 128 may further include secure routing support 130. The secure routing support 130 may be used with the crypto engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted agent or other trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security engine (CSE) incorporated in a system-on-a-chip (SoC) of the computing device 100. In some embodiments, the security engine 138 may be embodied as a manageability engine, a converged security and manageability engine (CSME), an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. The cryptographic engine 140 may encrypt and/or decrypt I/O data read or written by the I/O controllers 144 in one or more direct memory access (DMA) operations to the memory 132. The crypto engine 140 includes an internal channel identifier (CID) table 142, which the crypto engine 140 uses to dynamically identify DMA channel(s) to be protected. The CID table 142 may be embodied as or otherwise include content addressable memory (CAM). As described further below, the CID table 142 may be controlled and/or programmed by trusted software, for example using the crypto engine programming support 126 of the processor 120, or the security engine 138. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, and other input devices, as well as displays and other output devices. As described above, the integrated controllers 144 and associated DMA channels are uniquely identified using identifiers called channel identifiers (CIDs).

Figure 2:
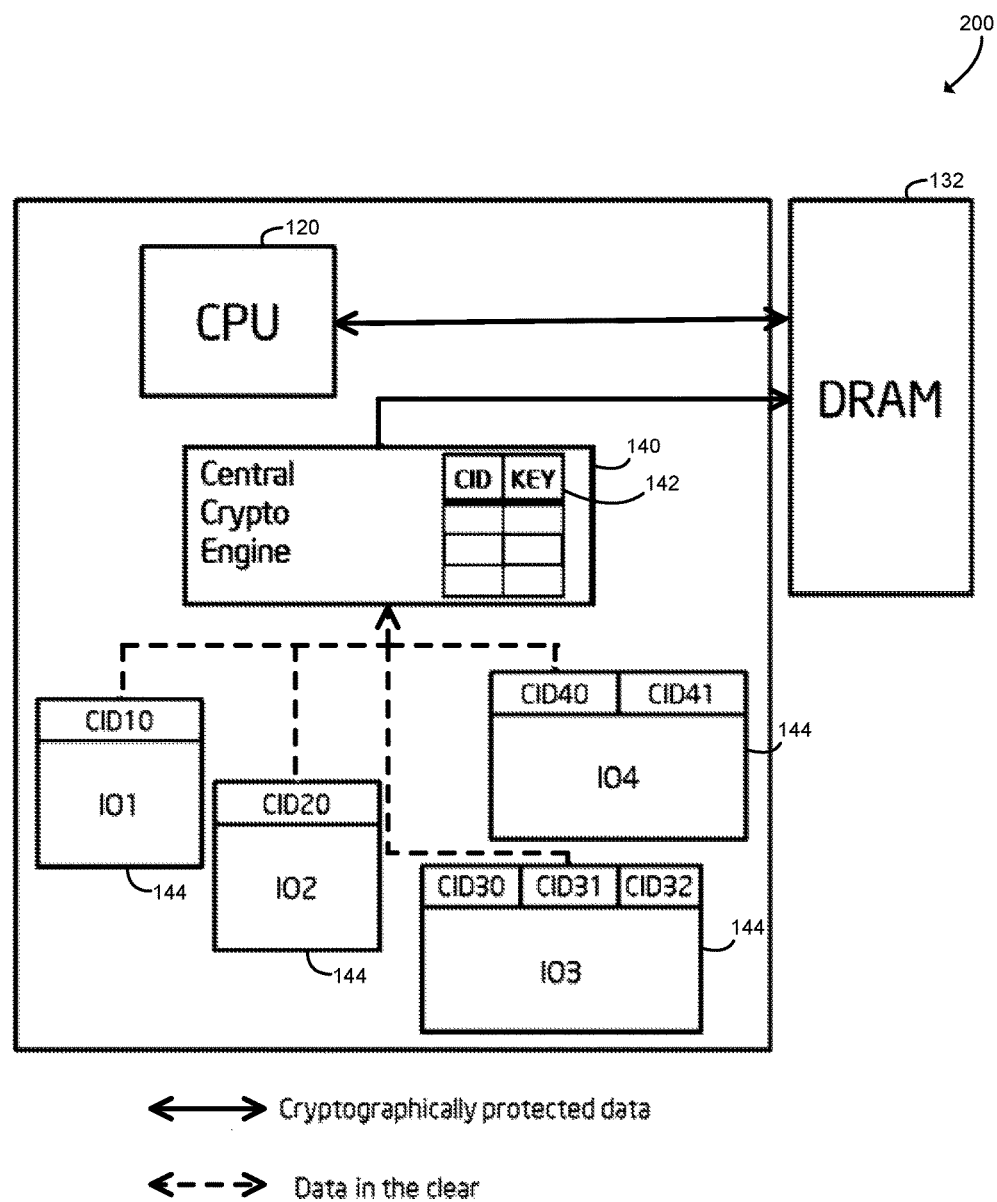
FIG. 2 is a simplified block diagram of an example configuration of the computing device of FIG. 1.

Referring now to FIG. 2, diagram 200 illustrates an example configuration of the computing device 100 including four I/O controllers 144 with controller IDs 1 to 4 respectively. As shown, controller IO1 has one DMA channel with channel ID "10." I/O controller IO3 has three DMA channels with Channel IDs "30," "31," and "32," and so on. Trusted software programs the crypto engine (CE) 140 (which, in an embodiment, may be referred to as a central crypto engine) with the CID of the DMA channel used by the trusted software, along with a corresponding secret key. The CE 140 intercepts DMA transactions having the relevant CID and cryptographically processes the DMA data as it is transferred to or from memory 132. The CE 140 writes or reads encrypted data into or from memory 132. Data is transmitted in the clear in the fabric (e.g., in the I/O subsystem 128). However, the I/O subsystem 128 (or processor control hub (PCH) or fabric controller) may provide hardware security 130 that prevents data from being routed to another device by rogue software that reconfigures the PCI Configuration space.

Figure 3:
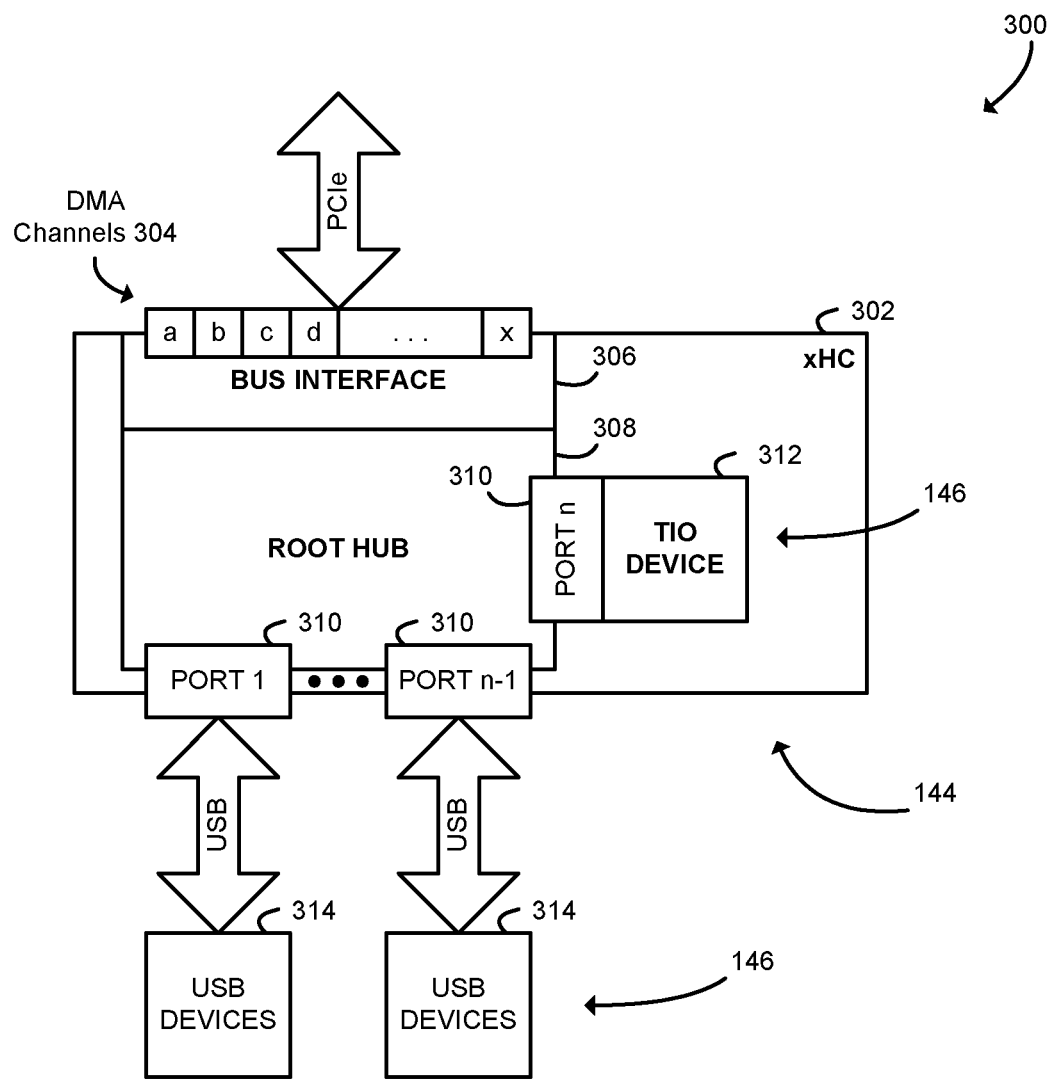
FIG. 3 is a simplified block diagram of a USB host controller of the computing device of FIGS. 1 and 2.

Referring now to FIG. 3, diagram 300 shows at least one embodiment of a USB host controller (xHC) 302 of the computing device 100. The xHC 302 establishes several DMA channels 304 that may securely communicate I/O data with the memory 132, for example using the crypto engine 140 as described further above. The xHC 302 includes a bus interface 306 to connect to the PCIe bus and a root hub 308. The root hub 308 establishes n ports 310. Port n is attached to a trusted I/O (TIO) device 312, which is described further below. The remaining ports 310 (port 1 through port n−1) may be attached to USB devices 314 via USB connections. In some embodiments, the xHC 302 may be embodied as an I/O controller 144 as described above, and the TIO device 312 and the USB devices 314 may be embodied as I/O devices 146 as described above. Thus, the TIO device 312 and/or the USB devices 314 may be capable of secure DMA transfers to memory 132 using the crypto engine 140, via the DMA channels 304.

As shown, the diagram 300 illustrates the TIO device 312 hardwired to the USB host controller 302 root hub 308 port (n). The TIO device 312 appears as a permanently attached USB device. The TIO device 312 may be enumerated the same as any USB device.

When the TIO device 312 is configured, data transfers over its configured endpoints are encrypted, making them secure. The encrypted endpoints of the USB TIO device 312 provide a secure path between a secure enclave and the host controller 302, or a USB device 314 attached to the host controller 302.

Over this secure path an enclave can issue commands to the host controller 302 to securely determine the set of USB devices 314 currently attached, their characteristics, and their configuration. Note that the host controller 302 is "trusted," i.e., given a command to retrieve information from a USB device 314, the host controller 302 will never return false information. However, it should be understood that the USB devices 314 are not "trusted," that is, a USB device 314 attached to the controller 302 could be compromised.

Additionally, this disclosure allows for the data transmitted or received over an endpoint of a USB device 314 (other than the TIO device 312) to be secured by encrypting the data. While an endpoint of a USB device 314 (other than the TIO device 312) is secured, the TIO device 312 may cause the xHC 302 to block topology change notifications (e.g., of USB device connects or disconnects) to system software, and direct the change notifications to a secure enclave instead. A secure enclave can then determine if a topology change will affect secure operations. If the change does not affect secure operations, then the enclave can signal the TIO device 312 to allow the notification to be forwarded to system software. If the change does affect secure operations, then the secure enclave can cause the TIO device 312 to block the notification or hold it off until after secure operations complete.

Additionally, the TIO device 312 may support Device Class specific features to block access to selected devices 314 or device features while secure operations are occurring.

Architecturally, a USB device supports up to 31 endpoints. Endpoint 0, the Default Control Endpoint, is always enabled. One of more of the remaining endpoints may be enabled when a device is "configured." The Default Control Endpoint of a USB device is used for a variety of "standard" USB operations defined in the USB core specification, for example to enumerate a device and load its driver, to retrieve a device's configuration information, and to select a target configuration. Depending on the Device Class, the Default Control Endpoint may also be used for Device Class specific operations.

The TIO device 312 does not define any TIO Device Class specific operations over the Default Control Endpoint. All secure operations are performed over a pair of Bulk In and Bulk Out endpoints, whose data is encrypted when they are configured.

Figure 4:
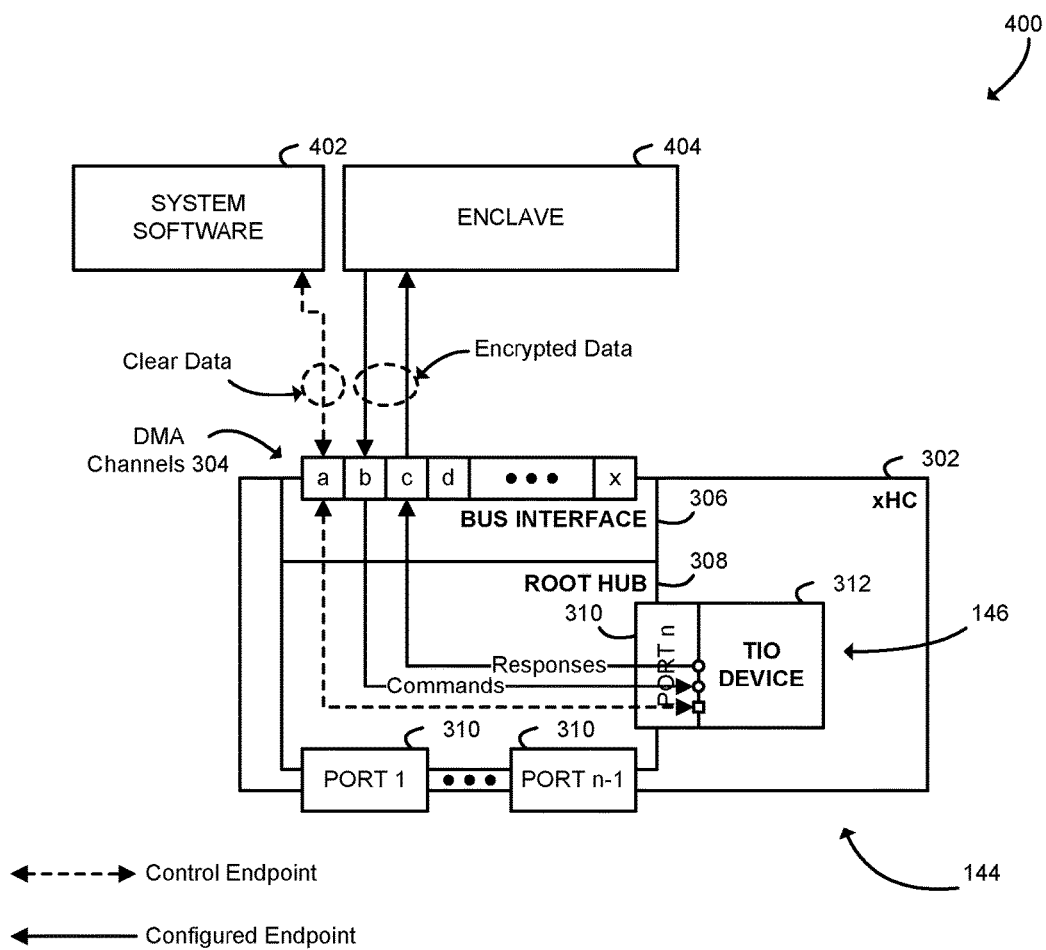
FIG. 4 is a schematic diagram of data flow for the USB host controller of FIG. 3.

Referring now to FIG. 4, diagram 400 illustrates communication between the TIO device 312 endpoints and untrusted system software 402 and a secure enclave 404. As described in this disclosure and as shown in FIG. 4, the Control Endpoint operations are (generally) in the clear and may be accessed by the untrusted System Software 402, and only Configured Endpoints are used to provide secure (encrypted) communication between the TIO device 312 and enclave software 404 (e.g., a secure enclave established with Intel® SGX).

As described above, the TIO device 312 is integrated into the host controller 302. The TIO device 312 provides access to internal host controller 302 registers and data structures, for example to determine the maximum number of devices 314 supported by a controller 302.

The TIO device 312 provides the ability for an enclave 404 to determine the devices 314 currently attached to the host controller 302.

The TIO device 312 provides the ability for an enclave 404 to issue requests to the Default Control Endpoint of any attached device 314. This feature allows an Enclave 404 to securely determine the Device Class, vendor, current configuration, and other properties of a device 314.

The TIO device 312 provides the ability to "lock" the topology, so change notifications are blocked to the standard interface used by the OS, but forwarded through the TIO device 312's secure interface to its managing secure enclave 404.

The TIO device 312 provides the ability for an enclave 404 to "unlock" specific topology changes, so that the topology changes can propagate to the OS (e.g. to system software 402).

The TIO device 312 provides the ability to block specific Control Endpoint request to a device 314, to prevent malicious operations from being performed. For example, some USB Device Classes allow the Control Endpoint to be used to access data that should be kept secure.

Note that the TIO Device 312 features described in this disclosure to enable secure enumeration and management of attached USB devices 314 may be implemented for other bus architectures (e.g., Bluetooth, Wi-Fi, WiGig, PCIe, etc.) to provide secure enumeration and management of their devices.

Figure 5:
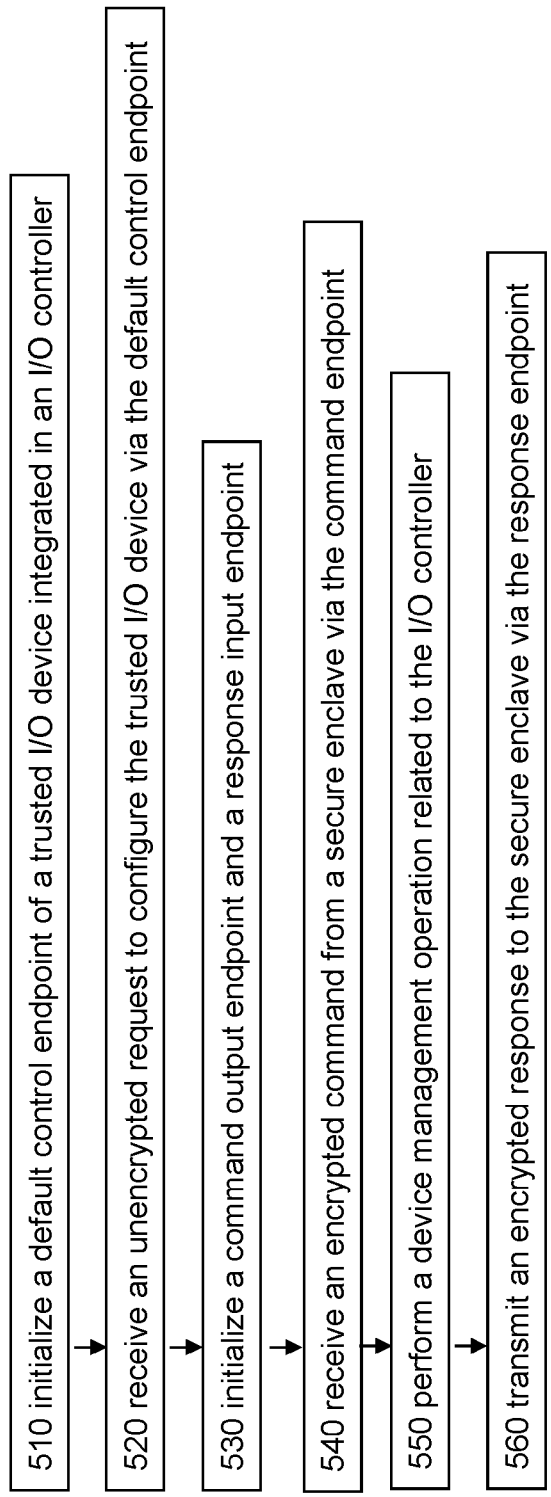
FIG. 5 is an embodiment of a method for secure I/O device management.

Referring now to FIG. 5, method 500 illustrates an embodiment of a method for secure I/O device management. In method 500, block 510 includes initializing, by a trusted I/O device integrated in an I/O controller of a computing device, a default control endpoint of the trusted I/O device.

Block 520 includes receiving, by the trusted I/O device, an unencrypted request to configure the trusted I/O device via the default control endpoint. Block 530 includes initializing, by the trusted I/O device, a command output endpoint and a response input endpoint in response to receiving the unencrypted request to configure the trusted 110 device. Block 540 includes receiving, by the trusted I/O device, an encrypted command from a secure enclave of the computing device via the command endpoint, wherein the secure enclave is established using secure enclave support of a processor of the computing device.

Block 550 includes performing, by the trusted I/O device, a device management operation related to the I/O controller in response to receiving the encrypted command. In embodiments, block 550 may also include retrieving state information from the I/O controller to generate an encrypted response. In embodiments, block 550 may also include issuing a request to a default control endpoint of an I/O device coupled to the I/O controller. In embodiments, block 550 may also include blocking a topology change notification indicative of an I/O device connect or an I/O device disconnect to system software, and forwarding the topology change notification to the secure enclave in response to blocking the topology change notification.

Block 560 includes transmitting, by the trusted I/O device, an encrypted response to the secure enclave via the response endpoint in response to performing the device management operation.

Illustrative examples of the technologies disclosed herein are provided below. An embodiment of the technologies may include any one or more, and any combination of, the examples described below.

Example 1 includes a computing device for secure I/O device management, the computing device comprising a processor having secure enclave support, wherein the processor is to establish a secure enclave using the secure enclave support; and an I/O controller including an integrated trusted I/O device, wherein the trusted I/O device is to (i) initialize a default control endpoint of the trusted I/O device, (ii) receive a unencrypted request to configure the trusted I/O device via the default control endpoint, (iii) initialize a command endpoint and a response endpoint in response to receipt of the unencrypted request, (iv) receive an encrypted command from the secure enclave via the command endpoint, (v) perform a device management operation related to the I/O controller in response to receipt of the encrypted command; and (vi) transmit an encrypted response to the secure enclave via the response endpoint in response to performance of the device management operation.

Example 2 includes the subject matter of Example 1, and wherein to perform the device management operation comprises to retrieve state information from the I/O controller to generate the encrypted response.

Example 3 includes the subject matter of any of Examples 1 and 2, and wherein to perform the device management operation comprises to issue a request to a default control endpoint of an I/O device coupled to the I/O controller.

Example 4 includes the subject matter of any of Examples 1-3, and wherein to perform the device management operation comprises to block a topology change notification indicative of an I/O device connect or an I/O device disconnect, and forward the topology change notification to the secure enclave in response to a blocking of the topology change notification.

Example 5 includes the subject matter of any of Examples 1-4, and wherein the I/O controller comprises a USB host controller including a root hub, and the trusted I/O device comprises a USB device permanently coupled to a port of the root hub of the USB host controller.

Example 6 includes a method for secure I/O device management, the method comprising initializing, by a trusted I/O device integrated in an I/O controller of a computing device, a default control endpoint of the trusted I/O device; receiving, by the trusted I/O device, an unencrypted request to configure the trusted I/O device via the default control endpoint; initializing, by the trusted I/O device, a command endpoint and a response endpoint in response to receiving the unencrypted request to configure the trusted I/O device; receiving, by the trusted I/O device, an encrypted command from a secure enclave of the computing device via the command endpoint, wherein the secure enclave is established using secure enclave support of a processor of the computing device; performing, by the trusted I/O device, a device management operation related to the I/O controller in response to receiving the encrypted command; and transmitting, by the trusted I/O device, an encrypted response to the secure enclave via the response endpoint in response to performing the device management operation.

Example 7 includes the subject matter of Example 6, and wherein performing the device management operation comprises retrieving state information from the I/O controller to generate the encrypted response.

Example 8 includes the subject matter of any of Examples 6 and 7, and wherein performing the device management operation comprises issuing a request to a default control endpoint of an I/O device coupled to the I/O controller.

Example 9 includes the subject matter of any of Examples 6-8, and wherein performing the device management operation comprises blocking a topology change notification indicative of an I/O device connect or an I/O device disconnect, and forwarding the topology change notification to the secure enclave in response to blocking the topology change notification.

Example 10 includes the subject matter of any of Examples 6-9, and wherein the I/O controller comprises a USB host controller including a root hub, and the trusted I/O device comprises a USB device permanently coupled to a port of a root hub of the USB host controller.

Example 11 includes a computing device comprising a processor and a memory having stored therein a plurality of instructions that when executed by the processor cause the computing device to perform the method of any of Examples 6-10.

Example 12 includes one or more machine readable storage media comprising a plurality of instructions stored thereon that in response to being executed result in a computing device performing the method of any of Examples 6-10.

Example 13 includes a computing device comprising means for performing the method of any of Examples 6-10.

What is claimed is:

1. An apparatus comprising:
   a processor having secure enclave support, wherein the processor is to establish a secure enclave using the secure enclave support; and
   an input/output (I/O) controller including an integrated trusted I/O device, wherein the trusted I/O device is to receive a unencrypted request to configure the trusted I/O device via a default control endpoint of the trusted I/O device, configure a command endpoint and a response endpoint to block topology change notifications to system software and direct the topology change notifications to the secure enclave instead in response to receipt of the unencrypted request, receive an encrypted command from the secure enclave via the command endpoint, perform a device management operation related to the I/O controller in response to receipt of the encrypted command; and transmit an encrypted response to the secure enclave via the response endpoint in response to performance of the device management operation.

2. The apparatus of claim 1, wherein to perform the device management operation includes to retrieve state information from the I/O controller to generate the encrypted response.

3. The apparatus of claim 1, wherein to perform the device management operation includes to issue a request to a default control endpoint of an I/O device coupled to the I/O controller.

4. The apparatus of claim 1, wherein to perform the device management operation includes to:
   block a topology change notification indicative of an I/O device connect or an I/O device disconnect, and
   forward the topology change notification to the secure enclave in response to a blocking of the topology change notification.

5. The apparatus of claim 1, wherein:
   the I/O controller comprises a Universal Serial Bus (USB) host controller including a root hub, and
   the trusted I/O device comprises a USB device permanently coupled to a port of the root hub of the USB host controller.

6. A method comprising:
   receiving, by a trusted input output (I/O) device integrated in an I/O controller of a computing device, an unencrypted request to configure the trusted I/O device via a default control endpoint of the trusted I/O device;
   configuring, by the trusted I/O device, a command endpoint and a response endpoint to block topology change notifications to system software and direct the topology change notifications to the secure enclave instead in response to receiving the unencrypted request to configure the trusted I/O device;
   receiving, by the trusted I/O device, an encrypted command from a secure enclave of the computing device via the command endpoint, wherein the secure enclave is established using secure enclave support of a processor of the computing device;
   performing, by the trusted I/O device, a device management operation related to the I/O controller in response to receiving the encrypted command; and
   transmitting, by the trusted I/O device, an encrypted response to the secure enclave via the response endpoint in response to performing the device management operation.

7. The method of claim 6, wherein performing the device management operation comprises retrieving state information from the I/O controller to generate the encrypted response.

8. The method of claim 6, wherein performing the device management operation comprises issuing a request to a default control endpoint of an I/O device coupled to the I/O controller.

9. The method of claim 6, wherein performing the device management operation includes:
blocking a topology change notification indicative of an I/O device connect or an I/O device disconnect; and
forwarding the topology change notification to the secure enclave in response to blocking the topology change notification.

10. The method of claim 6, wherein:
the I/O controller includes a universal serial bus (USB) host controller including a root hub; and
the trusted I/O device comprises a USB device permanently coupled to a port of a root hub of the USB host controller.

11. A system comprising:
a memory;
a processor having secure enclave support, wherein the processor is to establish a secure enclave using the secure enclave support;
a first input/output (I/O) controller including an integrated trusted I/O device, wherein the trusted I/O device is to receive a unencrypted request to configure the trusted I/O device via a default control endpoint of the trusted I/O device, configure a command endpoint and a response endpoint to block topology change notifications to system software and direct the topology change notifications to the secure enclave instead in response to receipt of the unencrypted request, receive an encrypted command from the secure enclave via the command endpoint, perform a device management operation related to the I/O controller in response to receipt of the encrypted command; and transmit an encrypted response to the secure enclave via the response endpoint in response to performance of the device management operation; and
a second I/O controller to communicate with a first untrusted I/O device.

12. The system of claim 11, further comprising a cryptographic engine to provide on-the-fly encryption and decryption of data transferred via direct memory access (DMA) operations from and to the first untrusted I/O device.

13. The system of claim 12, wherein the cryptographic engine includes an internal channel identifier (CID) table to dynamically identify a DMA channel associated with the first untrusted I/O device.

14. The system of claim 13, further comprising security hardware to prevent the data from being routed to a second untrusted I/O device.

15. The apparatus of claim 1, wherein the I/O controller includes registers to which the trusted I/O device provides access.

16. The apparatus of claim 1, wherein the trusted I/O device is to provide internal state of the I/O controller to the secure enclave.

17. The apparatus of claim 1, wherein the trusted I/O device provides for topology change notifications to be blocked to an interface to an operating system.

18. The apparatus of claim 17, wherein the trusted I/O device provides for topology change notifications to be forwarded to the secure enclave.

19. The apparatus of claim 18, wherein the trusted I/O device provides for topology change notifications to propagate from the secure enclave to the operating system.

20. The apparatus of claim 1, wherein the trusted I/O device provides for blocking control endpoint requests to an untrusted I/O device.

* * * * *